US012107351B2

(12) United States Patent
Ebisawa et al.

(10) Patent No.: US 12,107,351 B2
(45) Date of Patent: Oct. 1, 2024

(54) ANTENNA

(71) Applicant: JAPAN AVIATION ELECTRONICS INDUSTRY, LIMITED, Tokyo (JP)

(72) Inventors: Takeshi Ebisawa, Tokyo (JP); Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 192 days.

(21) Appl. No.: 17/617,861

(22) PCT Filed: Mar. 24, 2020

(86) PCT No.: PCT/JP2020/012893
§ 371 (c)(1),
(2) Date: Dec. 9, 2021

(87) PCT Pub. No.: WO2020/261678
PCT Pub. Date: Dec. 30, 2020

(65) Prior Publication Data

US 2022/0239003 A1 Jul. 28, 2022

(30) Foreign Application Priority Data

Jun. 26, 2019 (JP) ................................ 2019-118248

(51) Int. Cl.
*H01Q 1/36* (2006.01)
*H01Q 9/04* (2006.01)
*H01Q 9/26* (2006.01)

(52) U.S. Cl.
CPC .......... *H01Q 9/265* (2013.01); *H01Q 9/0435* (2013.01)

(58) Field of Classification Search
CPC ...... H01Q 9/265; H01Q 9/0435; H01Q 9/045; H01Q 7/00
(Continued)

(56) References Cited

U.S. PATENT DOCUMENTS 9,065,179 B2 6/2015 Kimura et al.
10,756,420 B2 * 8/2020 Kosaka ................. H01Q 13/10
(Continued)

FOREIGN PATENT DOCUMENTS

CN 103000993 A 3/2013
JP 2003158413 A 5/2003
(Continued)

OTHER PUBLICATIONS

International Search Report (ISR) (and English language translation thereof) dated Jun. 30, 2020 issued in International Application No. PCT/JP2020/012893.

(Continued)

*Primary Examiner* — Jean B Jeanglaude
(74) *Attorney, Agent, or Firm* — Holtz, Holtz & Volek PC

(57) ABSTRACT

An antenna is provided with a conductive member. The conductive member has a main part, an opposing part, a first feed terminal, and a second feed terminal. The main part extends along a horizontal plane so as to have an opened ring shape. The main part has a first end section and a second end section that are located apart from each other. The opposing part includes a first opposing part provided on the first end section and a second opposing part provided on the second end section. The first opposing part and the second opposing part are spaced apart from, and opposed to, each other. The main part has a thin part that is thinner than both the first opposing part and the second opposing part.

6 Claims, 5 Drawing Sheets

(58) Field of Classification Search
USPC ........................................................ 343/700 R
See application file for complete search history.

(56) References Cited

U.S. PATENT DOCUMENTS

| | | | | |
|---|---|---|---|---|
| 2002/0190909 | A1* | 12/2002 | Yamamoto ............. | H01Q 5/371 343/742 |
| 2005/0264458 | A1 | 12/2005 | Takagi et al. | |
| 2014/0203987 | A1 | 7/2014 | Itoh et al. | |
| 2014/0203993 | A1* | 7/2014 | Toyao .................... | H01Q 13/16 343/867 |
| 2018/0090833 | A1 | 3/2018 | Kosaka | |

FOREIGN PATENT DOCUMENTS

| | | | |
|---|---|---|---|
| JP | 2005064596 | A | 3/2005 |
| JP | 2005341224 | A | 12/2005 |
| JP | 2016225956 | A | 12/2016 |
| JP | 2018174585 | A | 11/2018 |
| WO | 2016159369 | A1 | 10/2016 |
| WO | 2018180976 | A1 | 10/2018 |

OTHER PUBLICATIONS

Japanese Office Action (and English language translation thereof) dated Jun. 24, 2020 issued in Japanese Application No. 2019-118248.
Written Opinion dated Jun. 30, 2020 issued in International Application No. PCT/JP2020/012893.
Chinese Office Action (and an English language translation thereof) dated Dec. 1, 2023, issued in counterpart Chinese Application No. 202080042548.6.

* cited by examiner

ANTENNA

TECHNICAL FIELD

This invention relates to an antenna configured to be mounted on a board, in particular, relates to an antenna having a split-ring resonator structure.

BACKGROUND ART

For example, an antenna having a split-ring resonator structure is disclosed in Patent Document 1.

As shown in FIG. 9, Patent Document 1 discloses an antenna 90 which has a dielectric layer 910, a conductive layer 920 and a feeding line 930. The conductive layer 920 is formed on one of paired principal surfaces of the dielectric layer 910. The feeding line 930 is formed on a remaining one of the paired principal surfaces of the dielectric layer 910. The conductive layer 920 is formed in a C-like shape. The conductive layer 920 has opposite ends which are apart from each other and face each other to form a capacitor 94. The conductive layer 920 and the feeding line 930 are connected to each other by using a via 950 which passes through the dielectric layer 910. In detail, the via 950 connects an end of the feeding line 930 to the vicinity of one of the ends of the conductive layer 920.

PRIOR ART DOCUMENTS

Patent Document(s)

Patent Document 1: JP A 2016-225956

SUMMARY OF INVENTION

Technical Problem

The antenna of Patent Document 1 is formed by using a printed circuit board (board). When an antenna formed by using a board does not have expected characteristics because of manufacturing variations, etc., a matching circuit such as inductors and capacitors should be additionally formed, or the board itself should be made again. Therefore, the antenna of Patent Document 1 tends to be high in cost.

It is therefore an object of the present invention to provide an antenna which is low in cost and has stable characteristics.

Solution to Problem

An aspect of the present invention provides an antenna comprising a conductive member. The conductive member has a body, facing portions, a first feeding terminal and a second feeding terminal. The body extends along a horizontal plane so as to have an open ring-like shape. The body has a first end and a second end which are apart from each other. The facing portions include a first facing portion provided on the first end and a second facing portion provided on the second end. The first facing portion and the second facing portion are apart from each other and face each other. The body has a thin portion which is thinner than any of the first facing portion and the second facing portion.

Advantageous Effects of Invention

According to an aspect of the present invention, the conductive member of the antenna can be formed as a discrete component separated from the board, and thereby the overall cost of the antenna can be reduced. Moreover, according to the antenna of an aspect of the present invention, each of the first facing portion and the second facing portion, which relatively easily get out of alignment, can be formed as a part of the conductive member. By forming the first facing portion and the second facing portion as described above, degradation of antenna characteristics, which might be caused because of the misalignment between the first facing portion and the second facing portion, can be reduced. Thus, an aspect of the present invention provides the antenna which is low in cost and has stable characteristics.

In addition, according to an aspect of the present invention, the inductance of the antenna can be made large by providing the thin portion on the body of the conductive member. As a result, the size of the whole antenna can be reduced without changing its antenna characteristics.

An appreciation of the objectives of the present invention and a more complete understanding of its structure may be had by studying the following description of the preferred embodiment and by referring to the accompanying drawings.

DESCRIPTION OF EMBODIMENTS

Figure 1:
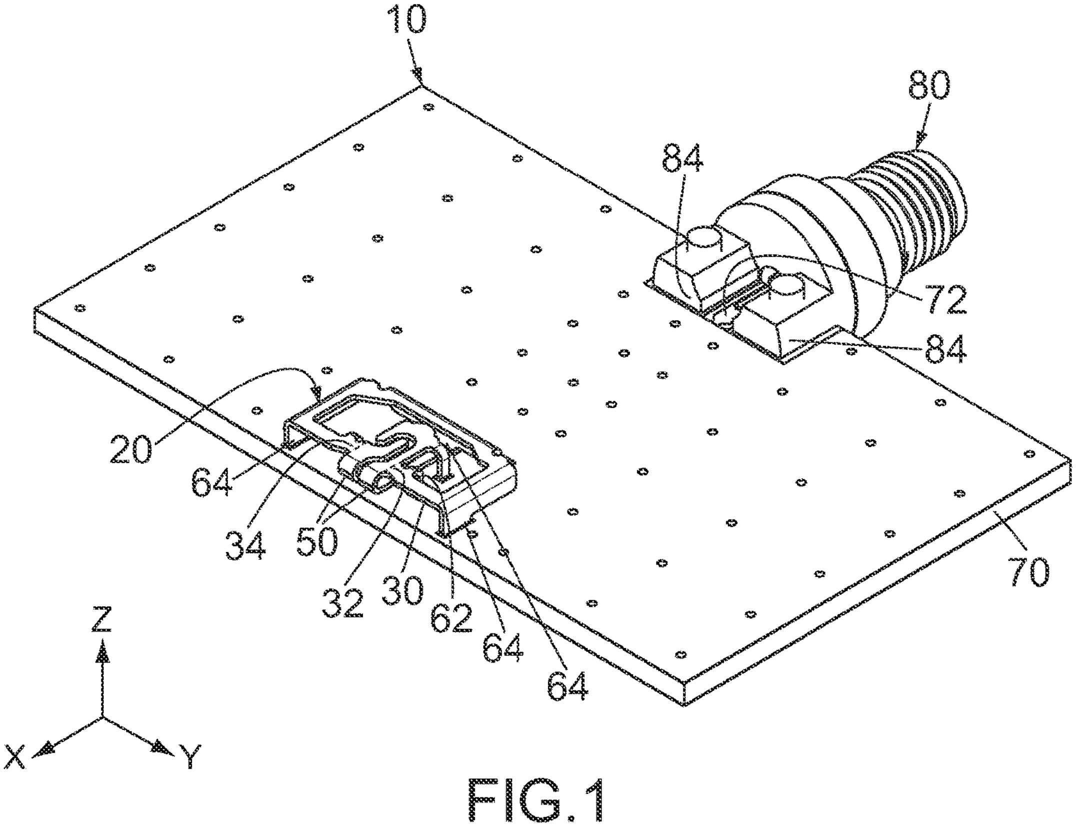
FIG. 1 is a perspective view showing an antenna according to an embodiment of the present invention, wherein boundary positions between a body and facing portions of a conductive member are illustrated with dashed line.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Figure 2:
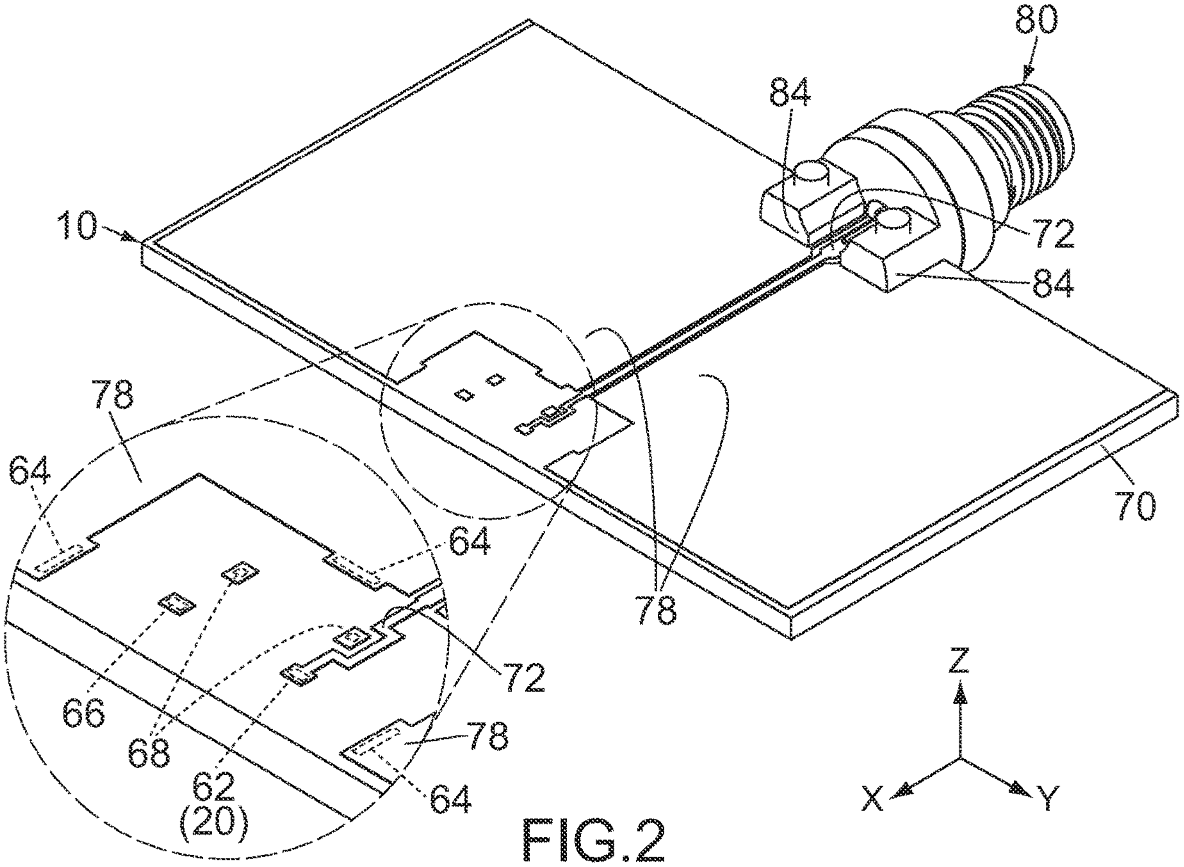
FIG. 2 is a partially cut-away, perspective view showing a board of the antenna of FIG. 1, wherein a part of the board enclosed by chain dotted lines is enlarged and illustrated, and in the enlarged view, connected positions of a first feeding terminal, second feeding terminals and fixed portions of the conductive member are illustrated with dashed line.

Referring to FIG. 1, an antenna 10 according to an embodiment of the present invention comprises a conductive member 20 made of conductor and a board 70. The conductive member 20 has a body 30, two facing portions 50, a first feeding terminal 62 and three second feeding terminals 64. The body 30 extends along a horizontal plane (XY-plane) so as to have an open ring-like shape. In other words, the body 30 is a ring having opposite ends which are apart from each other. In detail, the body 30 has a first end 32 and a second end 34. The first end 32 and the second end 34 are located at opposite ends of the body 30, respectively, and are apart from each other with the facing portions 50 located therebetween. Each of the first feeding terminal 62 and the second feeding terminals 64 extends downward, or in the negative Z-direction, from the body 30 in a perpendicular direction (Z-direction: upper-lower direction) perpendicular to the XY-plane. Referring to FIGS. 1 and 2, the board 70 extends along the XY-plane. The board 70 is a printed circuit board and is formed with a signal line 72 and a ground plane 78.

The conductive member 20 of the present embodiment is configured to be mounted on the board 70 to form the antenna 10 together with the board 70. In the antenna 10, the first feeding terminal 62 of the conductive member 20 is fixed on and connected to the signal line 72 of the board 70 via soldering, etc. In the antenna 10, each of the second feeding terminals 64 of the conductive member 20 is fixed on and connected to the ground plane 78 of the board 70 via soldering, etc. The conductive member 20 has an inductance component and a capacitance component as described later and works as an LC resonator of the antenna 10. Thus, the antenna 10 is a resonant antenna, and the conductive member 20 works as the antenna 10 together with the signal line 72 and the ground plane 78 of the board 70.

According to the present embodiment, the conductive member 20, i.e. the LC resonator, of the antenna 10 can be formed as a discrete component separated from the board 70. According to this structure, inductance and capacitance of the antenna 10 can be adjusted only by the conductive member 20, and thereby the overall cost of the antenna 10 can be reduced.

In the present embodiment, the board 70 is connected to a connector 80. In detail, the signal line 72 of the board 70 is connected to a signal terminal (not shown) of the connector 80, and the ground plane 78 of the board 70 is connected to a ground terminal 84 of the connector 80. According to this structure, the antenna 10 can send out signals transmitted from the connector 80 and can transmit received signals to the connector 80. However, the present invention is not limited thereto, but the connector 80 may be provided as necessary.

Figure 3:
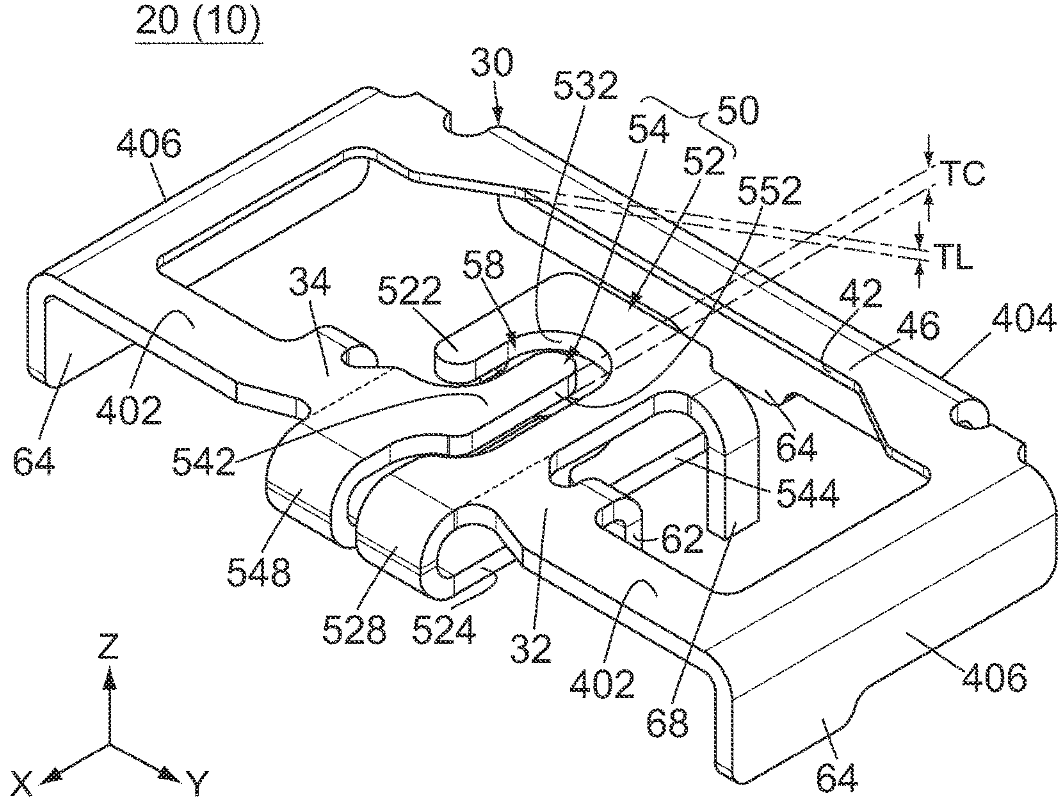
FIG. 3 is a perspective view showing the conductive member of the antenna of FIG. 1, wherein boundary positions between the body and the facing portions of the conductive member are illustrated with dashed line.

Referring to FIG. 3, the conductive member 20 of the present embodiment is formed by bending a single metal plate which has a flat-plate shape of a thickness TC. In other words, the conductive member 20 is a single metal plate with bends. However, the present invention is not limited thereto. For example, the conductive member 20 may be formed by welding a plurality of metal members to each other. Moreover, as described later, the structure of the conductive member 20 can be variously modified as necessary.

Figure 4:
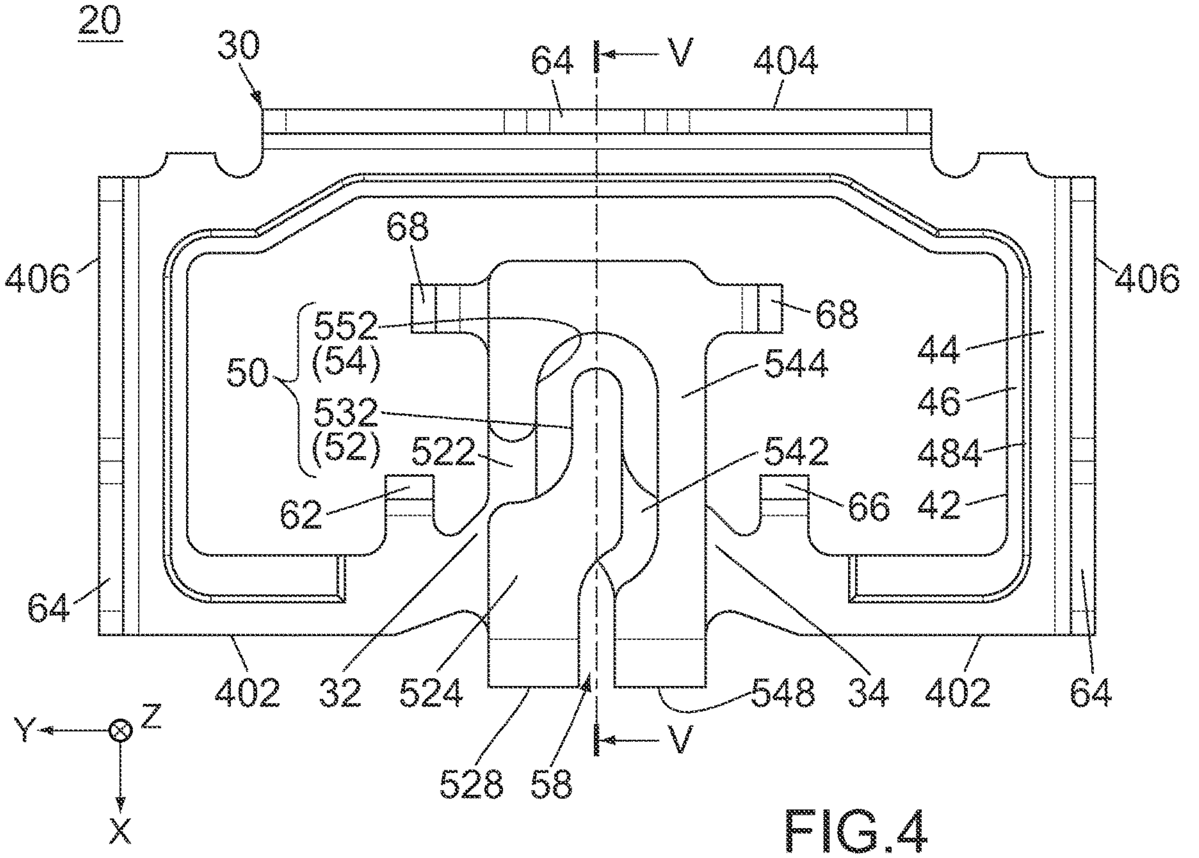
FIG. 4 is a bottom view showing the conductive member of FIG. 3.

As shown in FIGS. 3 and 4, the body 30 of the conductive member 20 has an angular C-like shape in the XY-plane. In detail, the body 30 has two front portions 402, one rear portion 404 and two side portions 406 which correspond to the front portions 402, respectively. Each of the front portions 402 is located at a front side (positive X-side) of the body 30 in a front-rear direction (X-direction) perpendicular to the Z-direction and extends along a lateral direction (Y-direction) perpendicular to both the X-direction and the Z-direction. The rear portion 404 is located at a rear side (negative X-side) of the body 30 and extends along the Y-direction. The side portions 406 are located at opposite sides of the body 30 in the Y-direction, respectively. Each of the side portions 406 extends along the X-direction and couples one of opposite ends of the rear portion 404 in the Y-direction and an outer end of the corresponding front portion 402 in the Y-direction to each other. The first end 32 is an inner end of one of the front portions 402 in the Y-direction. The second end 34 an inner end of a remaining one of the front portions 402 in the Y-direction.

The body 30 of the present embodiment has the aforementioned structure and has a rectangular ring shape when seen along the Z-direction. Each of the rear portion 404 and the side portions 406 of the present embodiment has a parallel part, or a part which extends in parallel to the XY-plane, and another part which is bent so as to extend downward from the parallel part. The body 30, which has the rear portion 404 and the side portions 406 formed as described above, is hardly deformed. However, the present invention is not limited thereto. For example, the body 30 may have a circular ring shape or may have a polygonal ring shape when seen along the Z-direction. Moreover, each of the rear portion 404 and the side portions 406 may have only the part which extends in parallel to the XY-plane.

In the present embodiment, the first feeding terminal 62 is located at the first end 32. One of the second feeding terminals 64 is located at the middle of the rear portion 404 of the body 30 in the Y-direction. The other two of the second feeding terminals 64 are located at front ends (positive X-side ends) of the two side portions 406 of the body 30, respectively. According to this arrangement, the body 30 of the conductive member 20 works as an inductor. However, the present invention is not limited thereto, but the arrangement of the first feeding terminal 62 and the second feeding terminals 64 can be variously modified, provided that the conductive member 20 has an inductance component.

The facing portions 50 of the conductive member 20 include a first facing portion 52 and a second facing portion 54. The first facing portion 52 is connected to the first end 32 and is located inward of the first end 32 in the Y-direction. The second facing portion 54 is connected to the second end 34 and is located inward of the second end 34 in the Y-direction. Thus, the facing portions 50 include the first facing portion 52 provided on the first end 32 and the second facing portion 54 provided on the second end 34.

The first facing portion 52 of the present embodiment has a first upper portion 522, a first lower portion 524 and a first coupling portion 528. The first upper portion 522 is located at an upper side (positive Z-side) of the first facing portion 52 and extends along the XY-plane. The first lower portion 524 is located at a lower side (negative Z-side) of the first facing portion 52 and extends along the XY-plane. The first coupling portion 528 couples a front end of the first upper portion 522 and a front end of the first lower portion 524 to each other.

The second facing portion 54 of the present embodiment has a second upper portion 542, a second lower portion 544 and a second coupling portion 548. The second upper portion 542 is located at an upper side of the second facing portion 54 and extends along the XY-plane. The second lower portion 544 is located at a lower side of the second facing portion 54 and extends along the XY-plane. The second coupling portion 548 couples a front end of the second upper portion 542 and a front end of the second lower portion 544 to each other.

The first facing portion 52 and the second facing portion 54 of the present embodiment are formed in the shapes described above and have the shapes corresponding to each other. However, the present invention is not limited thereto, but the shape of each of the first facing portion 52 and the second facing portion 54 can be variously modified as necessary.

Figure 5:
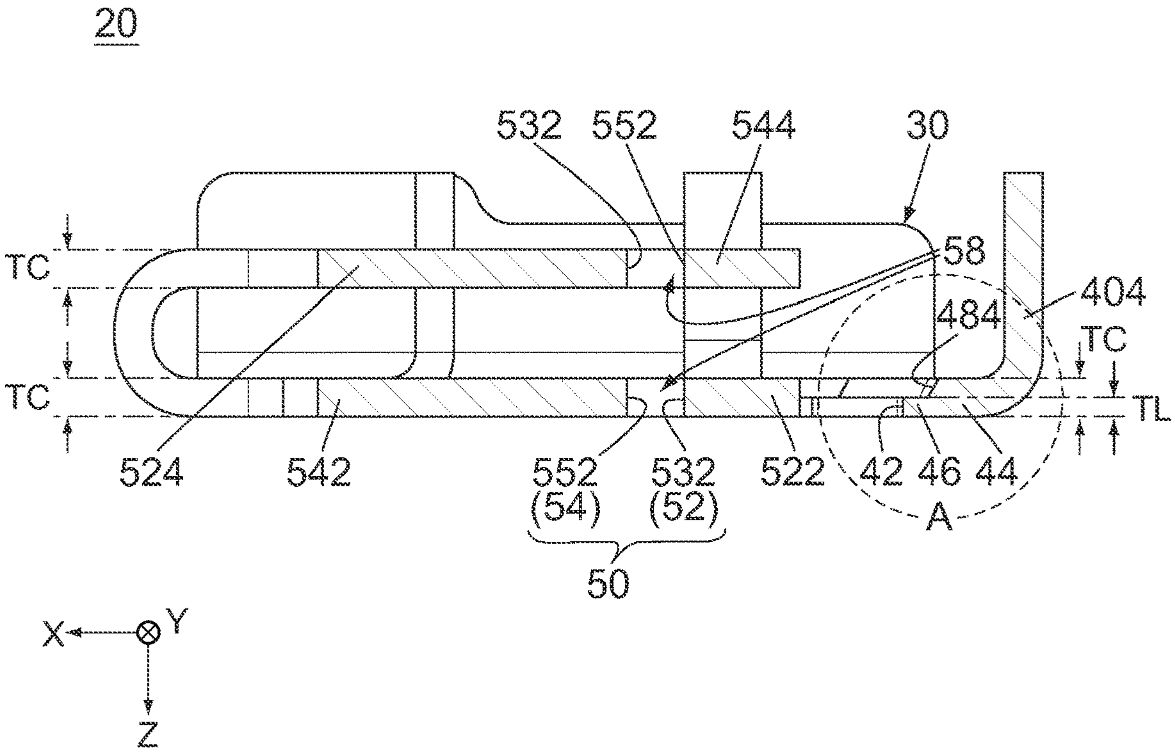
FIG. 5 is a cross-sectional view showing the conductive member of FIG. 4, taken along line V-V.

Referring to FIGS. 3 to 5, a split 58 is formed between the first facing portion 52 and the second facing portion 54. The first upper portion 522 of the first facing portion 52 and the second upper portion 542 of the second facing portion 54 are located at positions same as each other in the Z-direction, and are apart from each other and face each other in the XY-plane with the split 58 located therebetween. The first lower portion 524 of the first facing portion 52 and the second lower portion 544 of the second facing portion 54 are located at positions same as each other the Z-direction, and are apart from each other and face each other in the XY-plane with the split 58 located therebetween.

Referring to FIGS. 4 and 5, the first facing portion 52 has a first edge surface 532 which is located at an edge thereof in the XY-plane. The first edge surface 532 is provided on the first upper portion 522 and the first lower portion 524 of the first facing portion 52. The second facing portion 54 has a second edge surface 552 which is located at an edge thereof in the XY-plane. The second edge surface 552 is provided on the second upper portion 542 and the second lower portion 544 of the second facing portion 54.

The first edge surface 532 of the first upper portion 522 and the second edge surface 552 of the second upper portion 542 are apart from each other and face each other in the XY-plane. The first edge surface 532 of the first lower portion 524 and the second edge surface 552 of the second lower portion 544 are apart from each other and face each other in the XY-plane. As can be seen from this arrangement, the first edge surface 532 and the second edge surface 552 work as a capacitor of the conductive member 20. In other words, the capacitor of the conductive member 20 of the present embodiment includes the first edge surface 532 provided on the first facing portion 52 and the second edge surface 552 provided on the second facing portion 54.

As described above, the first facing portion 52 and the second facing portion 54 are apart from each other and face each other and thereby work as a capacitor. According to the present embodiment, the first facing portion 52 and the second facing portion 54 face, at least in part, each other in the XY-plane. However, the present invention is not limited thereto, but a facing direction of the first facing portion 52 and the second facing portion 54 can be variously modified.

Referring to FIG. 3, the conductive member 20 has a split-ring resonator structure. The first facing portion 52 and the second facing portion 54 are arranged on opposite ends of a split-ring, respectively. The existing first facing portion and the existing second facing portion, which are arranged as described above, tend to be misaligned with each other in a manufacturing process of an antenna. In contrast, according to the antenna 10 of the present embodiment, each of the first facing portion 52 and the second facing portion 54, which relatively easily get out of alignment in the existing structure, can be formed as a part of the conductive member 20 which is a unitary member. By forming the first facing portion 52 and the second facing portion 54 as described above, degradation of antenna characteristics, which might be caused because of the misalignment between the first facing portion 52 and the second facing portion 54, can be reduced. Thus, the present embodiment provides the antenna 10 which is low in cost and has stable characteristics.

As shown in FIGS. 3 and 4, the conductive member 20 of the present embodiment has three fixed portions 66 and 68 in addition to the body 30, the facing portions 50, the first feeding terminal 62 and the second feeding terminals 64. Each of the fixed portions 66 and 68 extends downward from the body 30. As previously described, the first feeding terminal 62 is provided to the first end 32. In contrast, the fixed portion 66 is provided to the second end 34. One of the fixed portions 68 is provided to the first upper portion 522 of the first facing portion 52. A remaining one of the fixed portions 68 is provided to the second lower portion 544 of the second facing portion 54.

Referring to FIG. 3 together with FIGS. 1 and 2, in the antenna 10, each of the fixed portions 66 and 68 is fixed on the board 70 via soldering, etc. In addition, as previously described, the first feeding terminal 62 is fixed on the board 70 via soldering, etc. When the first feeding terminal 62 and the fixed portions 66 and 68 are fixed on the board 70, a movement of each of the first facing portion 52 and the second facing portion 54 is reduced in the Z-direction. Thus, the misalignment between the first edge surface 532 of the first facing portion 52 and the second edge surface 552 of the second facing portion 54 is reduced, and thereby degradation of antenna characteristics can be reduced. However, the present invention is not limited thereto, but the fixed portions 66 and 68 may be provided as necessary. Moreover, the number and the arrangement of the fixed portions 66 and 68 can be variously modified as necessary.

Referring to FIG. 5, a thickness of the first facing portion 52 (thickness TC) and a thickness of the second facing portion 54 (thickness TC) are same as each other. More specifically, each of the first facing portion 52 and the second facing portion 54 is a part of a metal plate having thickness TC. By making the thickness TC sufficiently large, degradation of antenna characteristics can be reduced even if the first edge surface 532 of the first facing portion 52 and the second edge surface 552 of the second facing portion 54 get out of alignment to some extent in the Z-direction. However, the present invention is not limited thereto. For example, the thickness of the first facing portion 52 and the thickness of the second facing portion 54 may be different from each other.

Figure 6:
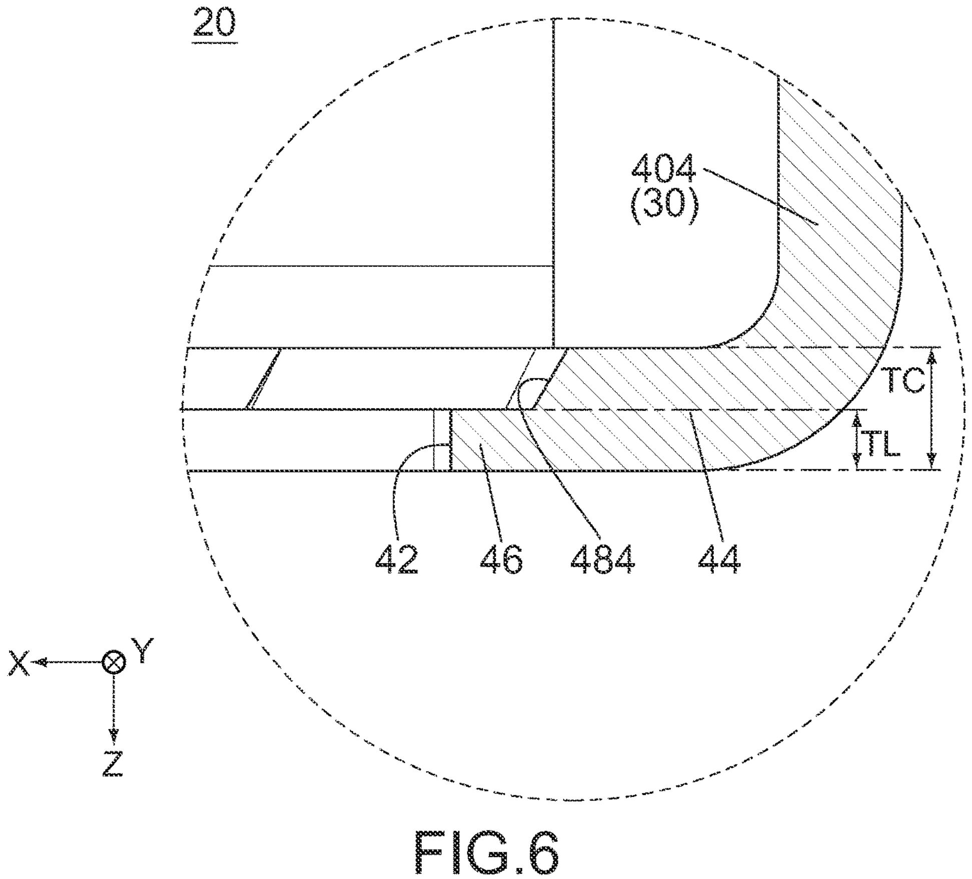
FIG. 6 is a cross-sectional view showing a part of the conductive member enclosed by dashed line A of FIG. 5.

Referring to FIGS. 4 to 6, the body 30 of the conductive member 20 of the present embodiment has an inner edge 42, a thick portion 44 and a thin portion 46. Referring to FIGS. 3 to 5, the inner edge 42 is an inside edge of the body 30 in the XY-plane. Referring to FIG. 5, a thickness of the thick portion 44 (thickness TC) is same as the thickness of the first facing portion 52 (thickness TC) and the thickness of the second facing portion 54 (thickness TC). More specifically, the thick portion 44 is a part of a metal plate having the thickness TC. In contrast, referring to FIGS. 3 and 5, a thickness of the thin portion 46 (thickness TL) is thinner than the thickness of the thick portion 44. More specifically, the thin portion 46 is a part of the metal plate having the thickness TC but is partially made thin by a process such as coining.

The thickness of the thin portion 46 which is formed as described above is thinner than any of the thickness of the first facing portion 52, the thickness of the second facing portion 54 and the thickness of the thick portion 44. In other words, the body 30 of the conductive member 20 of the present embodiment has the thin portion 46 which is thinner than any of the first facing portion 52, the second facing portion 54 and the thick portion 44. By providing the thin portion 46 on the body 30, cross-section of electric current which flows through the body 30 is made small, and thereby inductance of the conductive member 20 can be made large. Thus, inductance of the antenna 10 (see FIG. 1) can be made large by providing the thin portion 46 on the body 30. As a result, the size of the whole antenna 10 can be reduced without changing its antenna characteristics.

Referring to FIGS. 4 and 5, according to the present embodiment, a part of the thin portion 46 is located on the inner edge 42 of the body 30 in the XY-plane. The inner edge 42 is a part which tends to contribute to inductance of the antenna 10 (see FIG. 1). Therefore, according to this arrangement, inductance of the antenna 10 can be easily made large. However, the present invention is not limited thereto. For example, the thin portion 46 may be located to be outward of the inner edge 42 in the XY-plane.

According to the present embodiment, the body 30 has the thick portion 44 which is thicker than the thin portion 46. The thin portion 46 is located over an area between the thick portion 44 and the inner edge 42 in the XY-plane. According to this arrangement, inductance of the antenna 10 (see FIG. 1) can be easily made large. However, the present invention is not limited thereto. For example, the body 30 may have no thick portion 44, and the whole body 30 may be the thin portion 46. According to this structure, inductance can be further made large. However, the present embodiment is preferable from a viewpoint of maintaining the strength of the body 30.

As previously described, the first facing portion 52, the second facing portion 54 and the thick portion 44 of the present embodiment have thicknesses same as each other. However, the present invention is not limited thereto. For example, the thick portion 44 may be thinner than any of the first facing portion 52 and the second facing portion 54, provided that the thick portion 44 is thicker than the thin portion 46. However, the present embodiment is preferable from a viewpoint of easy fabrication of the conductive member 20.

Referring to FIG. 6, in the present embodiment, the thin portion 46 is a part which is recessed upward from the thick portion 44. A boundary surface 484 is formed between the thin portion 46 and the thick portion 44. The thin portion 46 has a lower surface which is a planar surface in parallel to the XY-plane. A part of the thick portion 44 which is located in the vicinity of the boundary surface 484 has a lower surface which is a planar surface in parallel to the XY-plane. On the other hand, the boundary surface 484 is a sloping surface oblique to the XY-plane. In other words, a distinct step is formed between the thin portion 46 and the thick portion 44. However, the present invention is not limited thereto. For example, the thin portion 46 may be a part which is recessed downward from the thick portion 44. The thin portion 46 may gradually become thicker toward the thick portion 44.

Referring to FIG. 6, in the present embodiment, the thickness of the thin portion 46 (thickness TL) is about half of the thickness of the thick portion 44 (thickness TC). However, the present invention is not limited thereto. For example, the thickness of the thin portion 46 may be not more than half of the thickness of the thick portion 44 or may be more than half of the thickness of the thick portion 44.

Referring to FIG. 4, the thin portion 46 of the present embodiment continuously extends between the first end 32 and the second end 34 along the inner edge 42 of the body 30. In particular, the thin portion 46 is formed only in the vicinity of the inner edge 42. According to this arrangement, the inductance component of the conductive member 20 can be sufficiently made high while degradation of the strength of the body 30, which might be caused because of the formation of the thin portion 46, can be prevented. However, the present invention is not limited thereto. For example, the thin portion 46 may be formed only on the rear portion 404 of the body 30.

The conductive member 20 of the present embodiment can be further variously modified in addition to the already described modifications.

Figure 7:
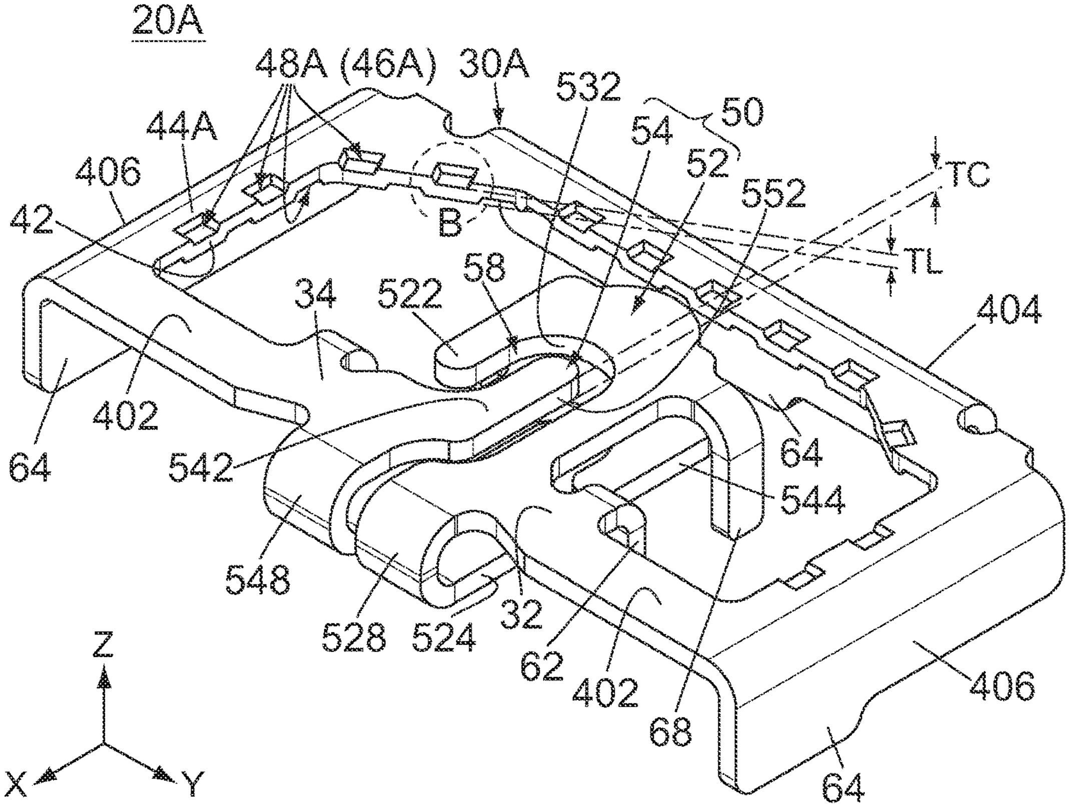
FIG. 7 is a perspective view showing a modification of the conductive member of FIG. 3.

For example, comparing FIG. 7 with FIG. 3, a conductive member 20A according to a modification has a structure same as that of the conductive member 20, except that it has a body 30A of a shape different from that of the body 30 of the conductive member 20. Comparing FIG. 7 with FIG. 4, the body 30A of the conductive member 20A has a structure same as that of the body 30, except that it has a thick portion 44A and a thin portion 46A which are different from the thick portion 44 and the thin portion 46 of the body 30, respectively.

Referring to FIG. 7, the thin portion 46A according to the modification is formed of a plurality of recesses 48A which are arranged along the inner edge 42 of the body 30A. The recesses 48A are alternately recessed in the Z-direction. In detail, the recess 48A, which is adjacent to the recess 48A recessed downward, is recessed upward, and the recess 48A, which is adjacent to the recess 48A recessed upward, is recessed downward. Moreover, the first facing portion 52, the second facing portion 54 and the thick portion 44A have thicknesses (thickness TC) same as each other. The thin portion 46A is thinner than any of the first facing portion 52, the second facing portion 54 and the thick portion 44A. A part of the thin portion 46A is located on the inner edge 42 of the body 30A in the XY-plane.

Figure 8:
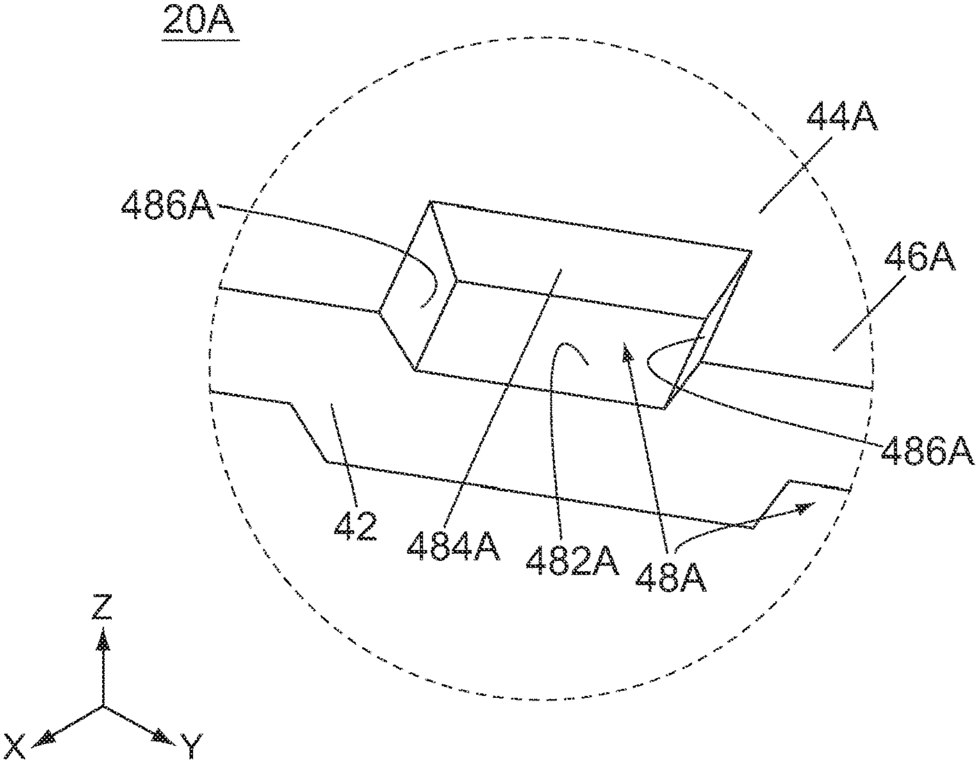
FIG. 8 is a perspective view showing a part of the conductive member enclosed by dashed line B of FIG. 7.
Figure 9:
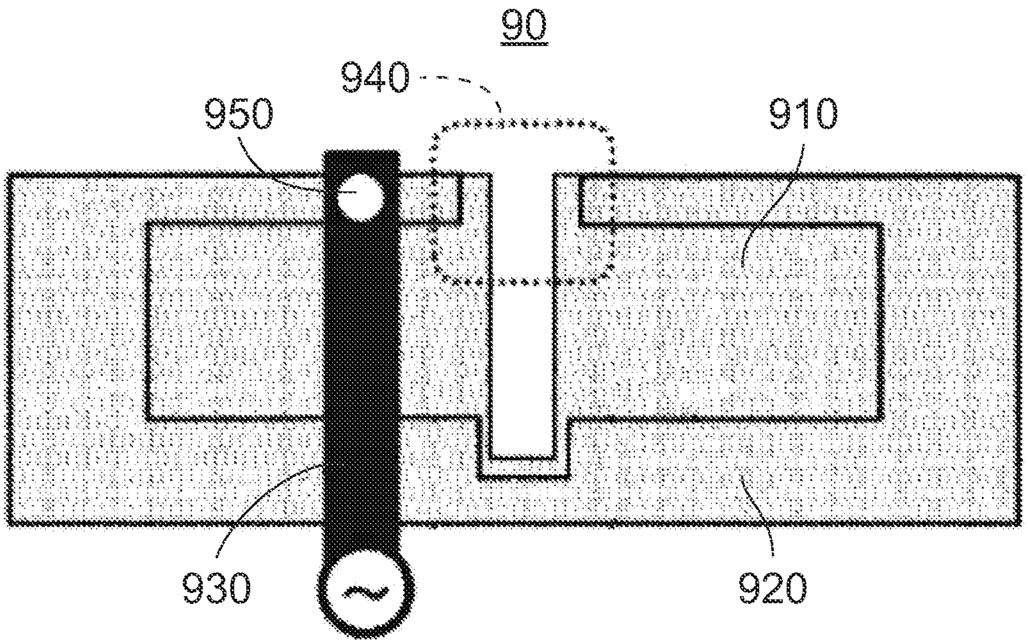
FIG.9 PRIOR ART
FIG. 9 is a plan view showing an antenna of Patent Document 1.

Referring to FIG. 8, the recesses 48A are formed via coining. Each of the recess 48A has a bottom surface 482A, a boundary surface 484A and two side surfaces 486A. The bottom surface 482A is a planar surface in parallel to the XY-plane. A part of the thick portion 44A which is located in the vicinity of the boundary surface 484A has an upper surface and a lower surface which are planar surfaces in parallel to the XY-plane. On the other hand, the boundary surface 484A is a sloping surface oblique to the XY-plane. In other words, a distinct step is formed between the thin portion 46A and the thick portion 44A.

According to the thin portion 46A of the modification, inductance of the antenna 10 (see FIG. 1) can be made large. As a result, the size of the whole antenna 10 can be reduced without changing its antenna characteristics.

The present application is based on a Japanese patent application of JP2019-118248 filed on Jun. 26, 2019 before the Japan Patent Office, the content of which is incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST

10 antenna
20, 20A conductive member
30, 30A body
32 first end
34 second end
402 front portion

404 rear portion
406 side portion
42 inner edge
44, 44A thick portion
46, 46A thin portion
48A recess
482A bottom surface
484, 484A boundary surface
486A side surface
50 facing portion
52 first facing portion
522 first upper portion
524 first lower portion
528 first coupling portion
532 first edge surface
54 second facing portion
542 second upper portion
544 second lower portion
548 second coupling portion
552 second edge surface
58 split
62 first feeding terminal
64 second feeding terminal
66, 68 fixed portion
70 board
72 signal line
78 ground plane
80 connector
84 ground terminal

The invention claimed is:

1. An antenna comprising a conductive member, wherein:

the conductive member has a body, facing portions, a first feeding terminal, and a second feeding terminal;

the body extends along a horizontal plane so as to have an open ring-like shape;

the body has a first end and a second end which are apart from each other;

the facing portions include a first facing portion provided on the first end and a second facing portion provided on the second end;

the first facing portion and the second facing portion are apart from each other and face each other;

the body has a thin portion which is thinner than the first facing portion and the second facing portion;

a part of the thin portion is located on an inner edge of the body in the horizontal plane;

the body has a thick portion which is thicker than the thin portion; and the thin portion is located over an area between the thick portion and the inner edge of the body in the horizontal plane.

2. The antenna as recited in claim 1, wherein the first facing portion and the second facing portion face, at least in part, each other in the horizontal plane.

3. The antenna as recited in claim 1, wherein all of the first facing portion, the second facing portion, and the thick portion have a same thickness.

4. The antenna as recited in claim 1, wherein the thin portion continuously extends between the first end and the second end along the inner edge of the body.

5. The antenna as recited in claim 1, wherein:

the thin portion comprises a plurality of recesses which are arranged along the inner edge of the body; and the recesses are alternately recessed in a direction perpendicular to the horizontal plane.

6. The antenna as recited in claim 1, wherein the conductive member is configured to be mounted on a board which extends along the horizontal plane.

* * * * *